Oct. 30, 1928.                                                              1,689,239
J. GEIGER
CLOVER HULLER
Filed April 27, 1926          3 Sheets-Sheet 2

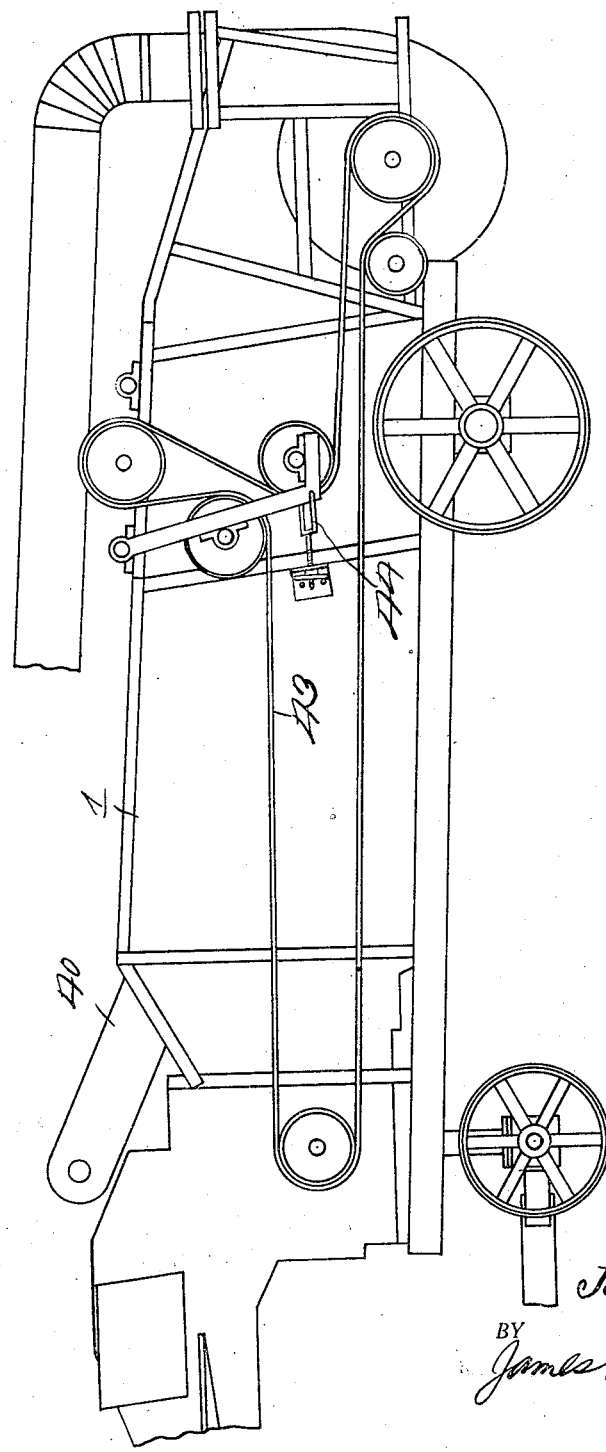

INVENTOR.
John Geiger
BY
James W. Martin
ATTORNEY.

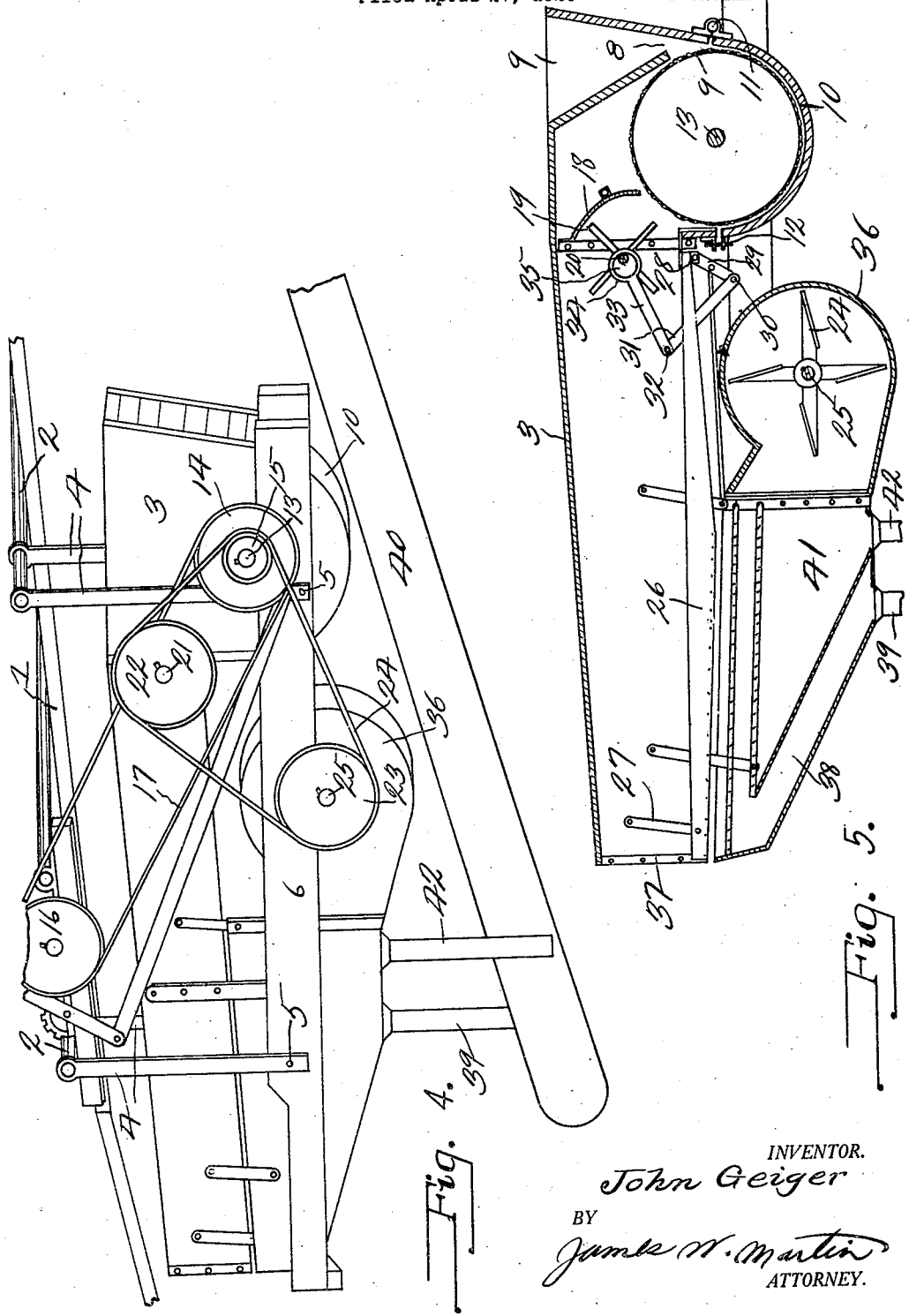

Patented Oct. 30, 1928.

1,689,239

UNITED STATES PATENT OFFICE.

JOHN GEIGER, OF MINDEN, IOWA.

CLOVER HULLER.

Application filed April 27, 1926. Serial No. 104,931.

The invention relates to clover hullers and has for its object to provide a means whereby the conventional form of grain thresher and separator may be used in part by adding a clover huller attachment disposed adjacent the side of said separator, suspended on hangers which hangers are carried by metal supports substantially disposed on the top of said separator.

A further object is to utilize the shaft, pulley and belt system of the thresing machine to operate the clover huller, also the elevator and other necessary mechanism employed in the threshing and separation of grain.

A further object of the invention is the great saving of original investment over the conventional form of clover hullers. As described above and as will be seen by the drawings this clover hulling attachment is but a small part of the machinery necessary for threshing clover, the principal part of the investment being in the conventional form of thresher and separator, several of which are in use in every farm community.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:

Figure 1 is a side view of a conventional form of grain threshing machine separator.

Figure 4 is a perspective view, showing the exterior of the clover huller attachment applied to a separator.

Figure 5 is a vertical longitudinal sectional view through the clover huller showing the interior of the clover huller attachment and its operation.

Figure 3:
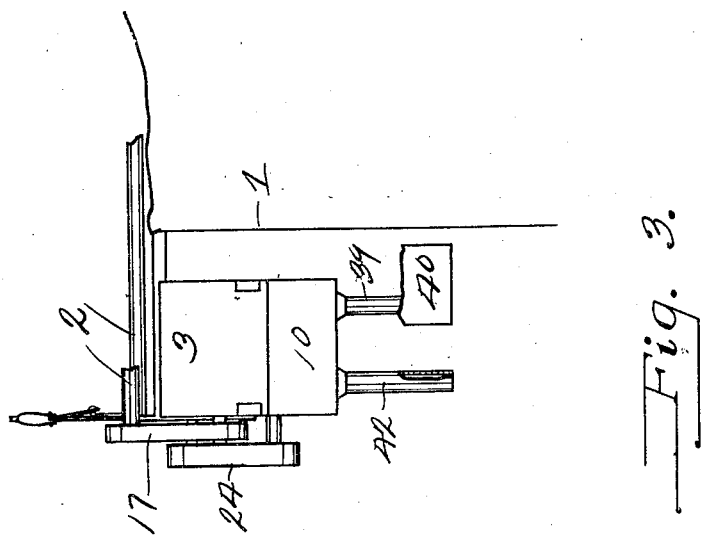
Figure 3 is an end view showing a portion of the machine.
Figure 2:
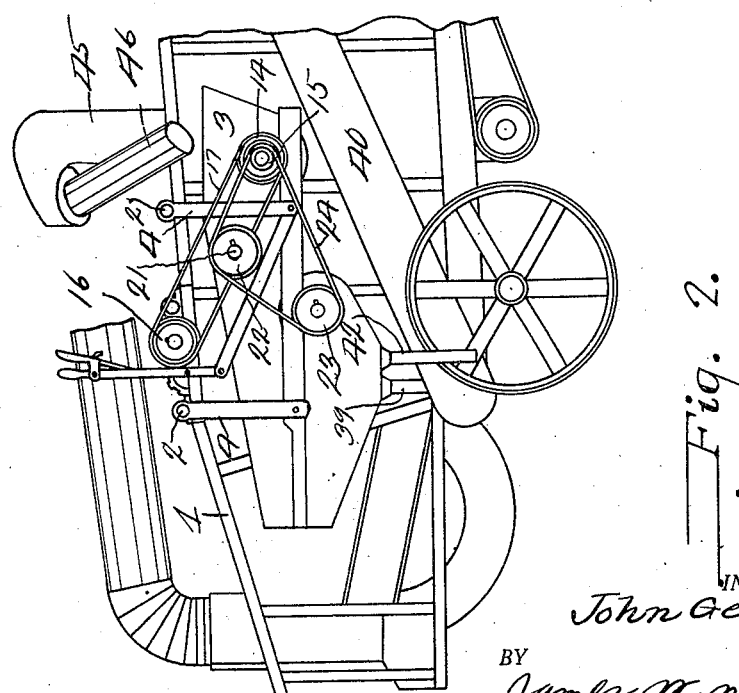
Figure 2 is a side view of a portion of a separator.

Referring to the drawing, the numeral 1 designates a conventional form of threshing machine separator and supported on outwardly extending arms 2 carried thereby is a clover hulling device 3, which hulling device is attached to the arms 2 by downwardly extending bars 4. The lower ends of the bars 4 are secured at 5 to the hulling machine sills 6. The hulling machine 3 is provided with a hopper 7, into which clover to be hulled is placed, and the clover from the hopper 7 is discharged through the opening 8 between the hulling cylinder 9 and the concave 10. The concave 10 is hingedly connected at 11 to the hopper casing and has its other end adjustably connected by means of a bolt 12, whereby the concave can be adjusted in relation to the outer periphery of the cylinder 9. The cylinder 9 is carried by a transversely disposed shaft 13, the outer end of which is provided with a pulley 14 and a pulley 15. Pulley 14 is driven by the drive pulley 16, which is belted thereto by means of a belt 17, therefore it will be seen that when the pulley 16 is rotated through the usual mechanism, the cylinder 9 will be simultaneously rotated at a relatively high speed of rotation. The hulled grain is discharged upwardly from the concave against the deflecting shield 18 where it comes into contact with the bladed beater 19. The beater 19 is carried by a transversely disposed shaft 21, one end of which is provided with a pulley 22, and extending over the pulley 22, the pulley 15 and the blower drive pulley 23 is a belt 24, which belt is driven by the pulley 15, therefore it will be seen that the power for driving the cylinder 9, the beater 19 and the fan 24 mounted in the shaft 25 is obtained from a single source of power. Disposed within the casing of the beater is a shaker tray 26, the outer end of which is supported by links 27 and the inner end of which is pivotally connected at 28 to a rocker arm 29, which rocker arm is pivotally connected at 30 to a pivoted rocker arm 31, which arm has pivotally connected thereto at 32 an upwardly and rearwardly extending arm 33. Arm 33 is provided with an eccentric strap 34, which surrounds an eccentric 35 carried by the shaft 20, therefore it will be seen the shaker tray 26 will be simultaneously operated with the other part of the device. Blower fan 25 is mounted in a casing 36, and directs a blast of air upwardly and rearwardly, thereby blowing the blast through the discharge opening 37. Grain which is not entirely clear of chaff drops into the hopper 38 and is discharged through the discharge pipe 39 onto the upwardly and rearwardly extending conveyor 40, and is conveyed rearwardly to the hopper 7 where it can be again run through the machine. The cleaned seed drops into the hopper 41 and is discharged through a discharge spout 42 in a position where it may be easily bagged. The threshing machine 1 is provided with the usual belt system 43, and a belt tightener 44 is provided in connection therewith. However the conveyor in conveying seed back to the hopper 7 discharges the same through the pipe 45 and angularly discharge pipe 46 through the hopper.

From the above it will be seen that a device is provided whereby an ordinary grain threshing machine separator may be converted into a clover huller at a small expense by utilizing the mechanism and belt system of the grain separator, and it will not be necessary to materially vary the construction of the threshing machine.

The invention having been set forth what is claimed as new and useful is:—

1. The combination with a grain threshing machine, means for operating said threshing machine, an inclined conveyor to one side of the threshing machine and below the same, of a clover hulling machine to one side of the threshing machine and above the conveyor, operating connections between the threshing machine and the clover hulling machine, means for discharging hulls from the clover hulling machine onto the conveyor, and means for discharging hulled clover to the outside of the conveyor.

2. The combination with a threshing machine, a clover hulling machine to one side of the threshing machine and driven therefrom, of means for supporting said clover hulling machine, said means comprising upwardly extending arms carried by opposite sides of the clover hulling machine, and outwardly extending arms carried by the threshing machine and on which the upwardly extending arms are mounted.

In testimony whereof I hereunto affix my signature.

JOHN GEIGER.